United States Patent
Nakagawa

(10) Patent No.: US 7,529,157 B2
(45) Date of Patent: May 5, 2009

(54) TIME CORRECTION CONTROL APPARATUS AND METHOD OF TIME CORRECTION CONTROL

(75) Inventor: Makoto Nakagawa, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 11/729,652

(22) Filed: Mar. 29, 2007

(65) Prior Publication Data

US 2007/0230285 A1    Oct. 4, 2007

(30) Foreign Application Priority Data

Mar. 31, 2006    (JP) .............. 2006-099887

(51) Int. Cl.
    *G04C 11/02*    (2006.01)
(52) U.S. Cl. ........................ 368/47
(58) Field of Classification Search ............ 368/10, 368/21, 28, 47
    See application file for complete search history.

(56) References Cited

U.S. PATENT DOCUMENTS

| | | | |
|---|---|---|---|
| 6,212,133 B1 * | 4/2001 | McCoy et al. .......... | 368/9 |
| 6,563,765 B1 | 5/2003 | Ishigaki | |
| 2002/0136094 A1 * | 9/2002 | Kawai .................. | 368/47 |

FOREIGN PATENT DOCUMENTS

| EP | 1 079 285 A2 | 2/2001 |
|---|---|---|
| JP | 09-178870 A | 7/1997 |
| JP | 09-304562 A | 11/1997 |
| JP | 10-082875 A | 3/1998 |
| JP | 2000-199792 A | 7/2000 |
| WO | WO 95/27927 A1 | 10/1995 |

* cited by examiner

*Primary Examiner*—Vit W Miska
(74) *Attorney, Agent, or Firm*—Frishauf, Holtz, Goodman & Chick, P.C.

(57) ABSTRACT

A time correction control apparatus which calculates a time difference between hour/minute/second indicated in hour/minute/second information included in a received GPS signal, and which corrects counted year/month/date and hour/minute/second by using both the received year/month/date information and hour/minute/second information when the calculated time difference is greater than the predetermined time difference, and corrects the counted hour/minute/second by using the received hour/minute/second information when the calculated time difference is smaller than the predetermined time difference.

6 Claims, 7 Drawing Sheets

CONFIGURATION OF SUBFRAMES

FRAME STRUCTURE

FORMAT OF NAVIGATION MESSAGE

FIG. 5

| WORD | BIT POSITION | BIT COUNT | | CONTENT | SCALE | CODE | UNIT |
|---|---|---|---|---|---|---|---|
| 1 | 1 | 22 | TLM | TELEMETRY WORD | | | |
| 2 | 31 | 22 | HOW | HAND OVER WORD | | | |
| 3 | 61 | 10 | WN | WEEK NUMBER | 0 | | |
| | 73 | 4 | URA | DISTANCE MEASURING PRECISION | | | |
| | 77 | 6 | SVhealth | SATELLITE HEALTH STATE | | | |
| | 83 | 2 MSB | IODC | CLOCK INFORMATION NUMBER | | | |
| 7 | 197 | 8 | TGD | GROUP LAG | -31 | ○ | s |
| 8 | 211 | 8 LSB | IODC | CLOCK INFORMATION NUMBER | | | |
| | 219 | 16 | toc | EPOCH TIME(CLOCK) | 4 | | s |
| 9 | 241 | 8 | af2 | CLOCK CORRECTION COEFFICIENT | -55 | ○ | s/s$^2$ |
| | 249 | 16 | af1 | CLOCK CORRECTION COEFFICIENT | -43 | ○ | s/s |
| 10 | 271 | 22 | af0 | CLOCK CORRECTION COEFFICIENT | -31 | ○ | s |

US 7,529,157 B2

TIME CORRECTION CONTROL APPARATUS AND METHOD OF TIME CORRECTION CONTROL

BACKGROUND OF THE INVENTION

1. Field of the Invention

The present invention relates to a time correction control apparatus and a method of time correction control.

2. Description of the Related Art

A GPS (Global Positioning System) satellite is an Earth-orbiting satellite which orbits around six orbits of inclination angle of about 55° at an altitude of 20,000 km. The number of GPS satellites has been increased due to enlargement of receiving range of a GPS receiver and reduction of regional difference in receiving state. At present, the number of GPS satellites is 28.

A GPS signal is sent from the GPS satellite. Here, the GPS signal is a radio signal sent from the GPS satellite. The frequency of the GPS signal sent from the GPS satellite is basically 1575.42 MHz (name: L1 wave). A signal called commercial C/A code (Coarse/acquisition code) is added to the frequency. Here, the C/A code is a code which is encoded by PRN code (Pseudo Random Noise Code) which is a pseudo noise code. Different C/A codes are allocated to the plurality of (28, at present) GPS satellites. Therefore, if signals are reversely dispersed to respective satellites using inherent C/A codes, the satellites can independently receive the respective signals.

In addition, the C/A code is repeatedly sent in a cycle of 1 ms (i.e., 1.023 MHz) a signal of 1023 bits. Data in which twenty cycles of C/A codes are made as one bit is navigation data. Here, the navigation data is data including orbit information of the GPS satellite, time information and the like.

The time information included in the navigation data includes HOW (Handover word) data which is hour/minute/second information and WN (Week Number) data which is year/month/day information. The HOW data is included in each subframe of the navigation data, and is sent from each GPS satellite every six seconds. The WN data is included only in a subframe 1 of the navigation data, and is sent from each GPS satellite every 30 seconds.

There is a known technique in which internal time of a time correction control apparatus is corrected utilizing the time information included in this navigation data. For example, signals (GPS signals) sent from a plurality of measuring satellites (GPS satellites) are received, and a receiving position and a receiving time are precisely obtained (e.g., Japanese Patent Application Publication Laid-open No. H9-178870).

According to this technique, however, it takes six seconds or more to receive one subframe from the plurality of subframes constituting the navigation data. Thus, in order to receive all of the plurality of subframes, the receiving time is correspondingly increased and thus, the power consumption of the time correction control apparatus is also increased.

The internal time is reset or stopped in some cases due to battery exhaustion, erroneous setting of user and a program error of the time correction control apparatus. In this case, a constant more error (time difference) with respect to the time information included in the GPS signal is generated. There is also a fear that this time difference is increased to a unit of year/month/day. Therefore, it is necessary to precisely correct the internal time and to reduce the power consumption by correcting not only the hour/minute/second but also the year/month/day.

SUMMARY OF THE INVENTION

Hence, it is a main object of the present invention to provide a time correction control apparatus and a time correction control method capable of precisely correcting time of internal time, and capable of reducing power consumption.

In accordance with a first aspect of the present invention, there is provided a time correction control apparatus, comprising a receiving section to receive a GPS signal, a clock section to count time, an obtaining section to obtain at least one of hour/minute/second information and year/month/day information included in the GPS signal received by the receiving section, a calculating section to calculate a time difference between hour/minute/second of the hour/minute/second information obtained by the obtaining section and hour/minute/second of the time counted by the clock section, a comparing section to compare the time difference calculated by the calculating section and a predetermined time difference, and a time correction control section to correct year/month/day and the hour/minute/second counted by the clock section using both the year/month/day information and the hour/minute/second information obtained by the obtaining section when the calculated time difference is greater than the predetermined time difference as a result of comparison made by the comparing section, and to correct the hour/minute/second counted by the clock section using the hour/minute/second information obtained by the obtaining section when the calculated time difference is smaller than the predetermined time difference.

In accordance with a second aspect of the present invention, there is provided a time correction control apparatus, comprising a receiving section to receive a GPS signal including a plurality of subframes constituting navigation data, a clock section to count time, an obtaining section to obtain at least one of hour/minute/second information and year/month/day information in any one of the plurality of the subframes included in the GPS signal received by the receiving section, a calculating section to calculate a time difference between hour/minute/second of the hour/minute/second information in any one of the plurality of the subframes obtained by the obtaining section and hour/minute/second of the time information counted by the clock section, a comparing section to compare the time difference calculated by the calculating section and a predetermined time difference, and a time correction control section to correct year/month/day and hour/minute/second counted by the clock section using both the year/month/day information and the hour/minute/second information obtained by the obtaining section when the calculated time difference is greater than the predetermined time difference as a result of comparison made by the comparing section, and to correct the hour/minute/second counted by the clock section using the hour/minute/second information in a first subframe among the plurality of the subframes obtained by the obtaining section when the calculated time difference is smaller than the predetermined time difference.

In accordance with a third aspect of the present invention, there is provided a time correction control apparatus, comprising a receiving section to receive a GPS signal including a plurality of subframes constituting navigation data, a clock section to count time, a determining section to determine whether a subframe is a first subframe among the plurality of the subframes included in the GPS signal received by the receiving section or one of the remaining subframes, and a time correction control section to correct year/month/day and hour/minute/second of the clock section using year/month/day information and hour/minute/second information in the first subframe when it is determined that a subframe included in the GPS signal received by the receiving device is the first subframe as a result of determination by the determining section, and to correct the hour/minute/second of the clock section using the hour/minute/second information in the one of the remaining subframes when it is determined that the subframe included in the GPS signal received by the receiving section is the one of the remaining subframes.

In accordance with a forth aspect of the present invention, there is provided a time correction control method used for a time correction control apparatus having a clock section comprising receiving a GPS signal, obtaining at least one of hour/minute/second information and year/month/day information included in the received GPS signal, calculating a time difference between hour/minute/second of the obtained hour/minute/second information and hour/minute/second of time counted by the clock section, comparing the calculated time difference and a predetermined time difference, and correcting the year/month/day and hour/minute/second counted by the clock section using both the obtained year/month/day information and the obtained hour/minute/second information when it is determined that the calculated time difference is greater than the predetermined time difference as a result of the comparing, and correcting the hour/minute/second counted by the clock section using the obtained hour/minute/second information when it is determined that the calculated time difference is smaller than the predetermined time difference.

In accordance with a fifth aspect of the present invention, there is provided a time correction control method used for a time correction control apparatus having a clock section comprising receiving a GPS signal including a plurality of subframes constituting navigation data, obtaining at least one of hour/minute/second information and year/month/day information in any one of the plurality of the subframes included in the received GPS signal, calculating a time difference between hour/minute/second of the hour/minute/second information in any one of the plurality of the obtained subframes and hour/minute/second of time counted by the clock section, comparing the calculated time difference and a predetermined time difference, and correcting year/month/day counted by the clock section using both the obtained year/month/day information and the obtained hour/minute/second information when the calculated time difference is greater than the predetermined time difference as a result of the comparing, and correcting the hour/minute/second counted by the clock section using the hour/minute/second information in a first subframe of the plurality of the obtained subframes when the calculated time difference is smaller than the predetermined time difference.

In accordance with a sixth aspect of the present invention, there is provided a time correction control method used for a time correction control apparatus having a clock section comprising receiving a GPS signal including a plurality of subframes constituting navigation data, determining whether a subframe is a first subframe of the plurality of the subframes or one of the remaining subframes of the plurality of the subframes included in the received GPS signal, and correcting year/month/day and hour/minute/second of a timing section using year/month/day information and hour/minute/second information in the first subframe when the subframe included in the received GPS signal is the first subframe as a result of the determining, and correcting the hour/minute/second of the timing section using the hour/minute/second information in the one of the remaining subframes when the subframe included in the received GPS signal is the one of the remaining subframes.

BRIEF DESCRIPTION OF THE DRAWINGS

The present invention will be understood completely by the following detailed description and accompanying drawings. The description and the drawings do not limit the invention, wherein

FIG. 5 is a table showing contents of a subframe 1 included in the navigation data shown in FIG. 3A;

DESCRIPTION OF THE PREFERRED EMBODIMENTS

A first embodiment of the present invention will be explained in detail with reference to the accompanying drawings. The scopes of the invention are not limited to the illustrated embodiments.

First Embodiment

The embodiments of the invention will be explained with reference to FIGS. 1 to 7.

First, a structure of an apparatus of the embodiment will be explained with reference to FIGS. 1, 2A, 2B and 2C.

Figure 1:
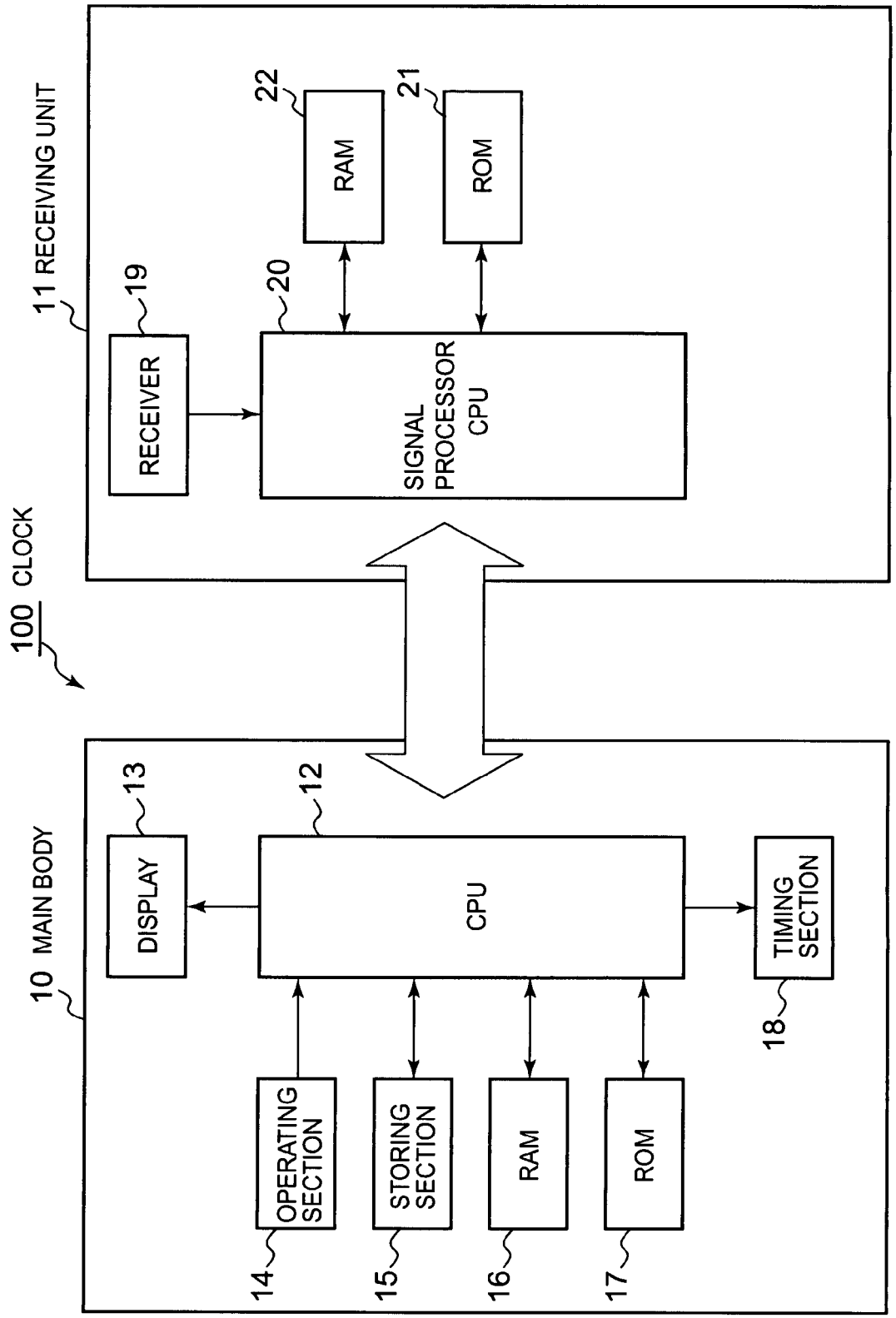
FIG. 1 is a clock according to preferable embodiments of the present invention.
Figure 2A:
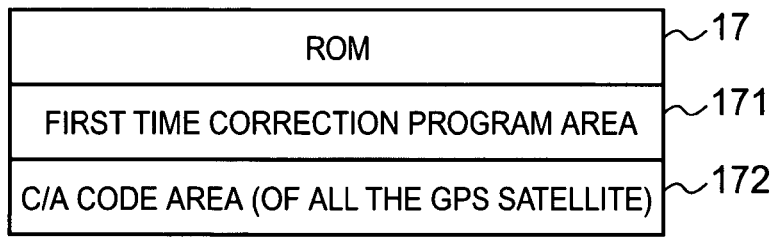
FIG. 2A is a diagram showing a storing configuration of a ROM of the clock shown in FIG. 1.
Figure 2B:
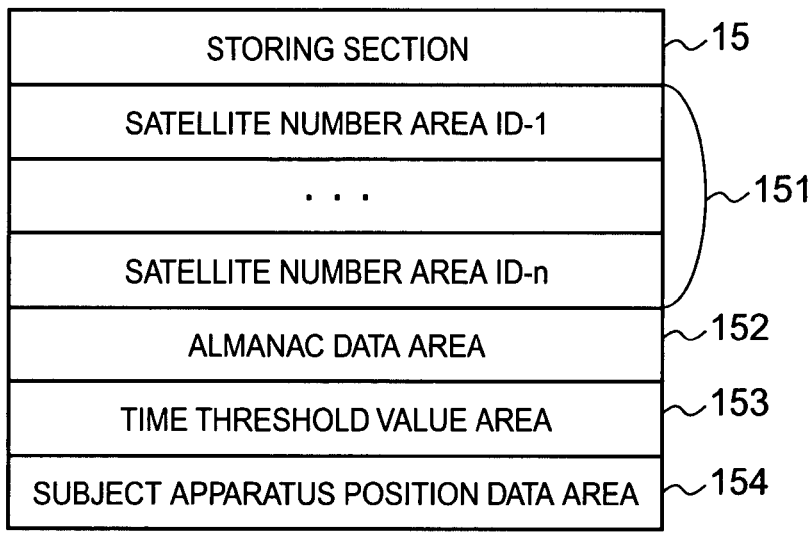
FIG. 2B is a diagram showing the storing configuration of a storing section of the clock shown in FIG. 1.
Figure 2C:
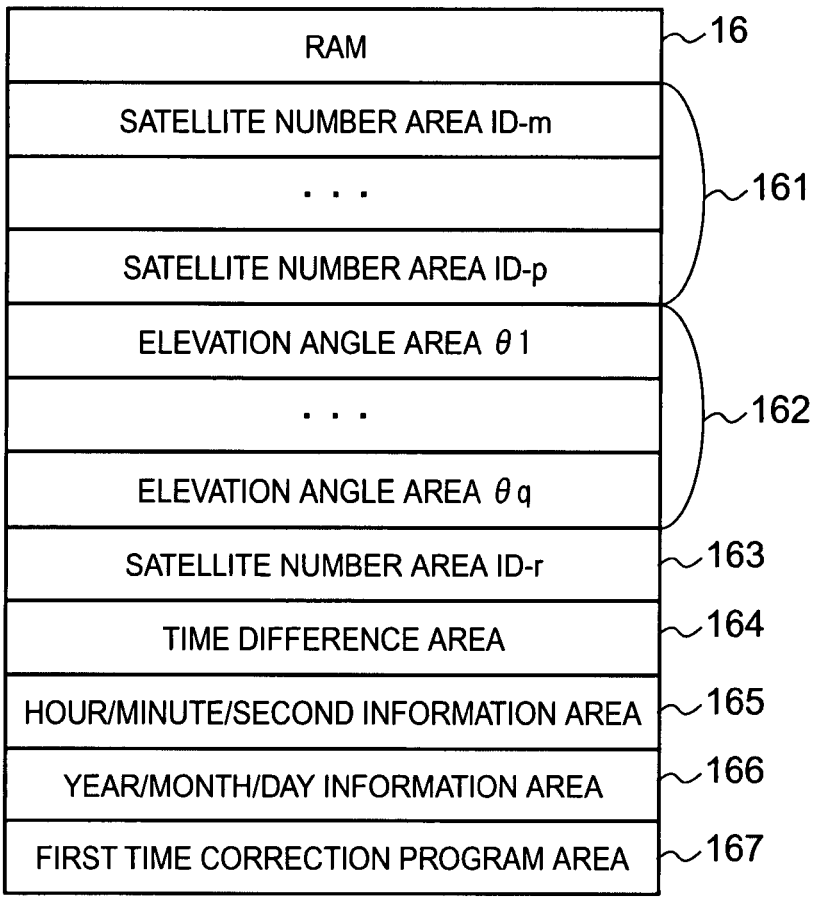
FIG. 2C is a diagram showing a storing configuration of a RAM of the clock shown in FIG. 1.

FIG. 1 shows a structure of a clock 100 of the embodiment. FIG. 2A shows a storing configuration of a ROM 17. FIG. 2B shows a storing configuration of a storing section 15. FIG. 2C shows a storing configuration of a RAM 16.

As shown in FIG. 1, the clock 100 includes a main body 10 and a receiving unit 11. The main body 10 includes a CPU 12, a display 13, an operating section 14, a storing section 15, a RAM 16, a ROM 17 and a timing section 18.

The CPU 12 develops, in the RAM 16, a program designated from system programs and various application programs stored in the ROM 17, and executes various processing in cooperation with the program developed in the RAM 16. Especially, a first time correction program is stored in the ROM 17.

The CPU 12 obtains a GPS signal in cooperation with a later-described first time correction program, and corrects internal time of the clock 100.

The display 13 comprises a small liquid crystal display, and digitally displays internal time clocked by a timing section 18.

The operating section 14 comprises keys and buttons for allowing the clock 100 to execute various functions. When these keys or buttons are operated, an operation signal of a corresponding switch is output to the CPU 12.

The storing section 15 comprises a readable and writable flush memory. As shown in FIG. 2B, the storing section 15 stores satellite numbers (satellite numbers ID-1 to ID-N, n is the total number of satellites) for identifying all GPS satellites, almanac data, a time threshold value and subject apparatus position data, respectively into a satellite number area 151, an almanac data area 152, a time threshold value area 153 and a subject apparatus position data area 154. Here, the almanac data means outline orbit information of the GPS satellite. The time threshold value is a threshold value of time difference between the hour/minute/second time information obtained from the GPS satellite and the hour/minute/second of internal time.

The RAM 16 is a volatile memory for storing various information sets, and has a work area where various programs and data are to be developed. In the RAM 16, as shown in FIG. 2C, satellite numbers (satellite numbers ID-m, . . . , ID-p: later-described one of all satellite numbers ID-1 to ID-N) of visible satellites, elevation angles (elevation angles θ1 to θq, wherein q is the number of visible satellites) of GPS satellites of the satellite numbers, one of satellite number (ID-r: one of the satellite numbers ID-m, . . . , ID-p) of the selected visible satellite, time difference, the hour/minute/second information, the year/month/day information and the first time correction program are developed in a satellite number area 161 of the visible satellite, an elevation angle area 162, a satellite number area 163, a time difference area 164, an hour/minute/second information area 165, a year/month/day information area 166 and a first time correction program area 167, respectively.

The ROM 17 is a memory for readably storing information. As shown in FIG. 2A, the ROM 17 stores the first time correction program and C/A codes of all of the GPS satellite in a first time correction program area 171 and a C/A code area 172.

The timing section 18 counts signals which are input from an oscillation circuit (not shown) to obtain the internal time. The timing section 18 outputs the internal time to the CPU 12. The internal time is a current time which is counted by the timing section 18.

The receiving unit 11 includes a receiver 19, a signal processor 20, a ROM 21 and a RAM 22.

The receiver 19 includes an antenna, a mixer and a receiving channel. The receiver 19 receives a GPS signal from the antenna (not shown). The receiver 19 amplifies the received GPS signal, and frequency-converts the same into a signal of intermediate frequency band which is sufficiently lower than carrier wave. The receiver 19 includes at least one receiving channel. Here, the receiving channel is a channel which receives a GPS signal from one of the GPS satellites. For example, when the number of receiving channels is 16, one GPS satellite is allocated to every 16-channel set. In this embodiment, it is assumed that only one channel is operating.

A signal processor 20 comprises a DSP (Digital Signal Processor), and carries out receiving processing. Here, as the receiving processing, navigation data is demodulated from the GPS signal which is received by the receiver 19, and transfers the navigation data to the CPU 12.

Next, the demodulation of the navigation data will be explained.

First, it is assumed that a C/A code of a satellite which is to be received is previously stored in the C/A code area 172 of the RAM 16 (a C/A code which is stored is called a stored C/A code, hereinafter). A stored C/A code is read, the stored C/A code and a C/A code which is received from the GPS satellite are brought into synchronization with each other in phase. After they are brought into synchronization with each other in phase, the reverse dispersion is carried out. With this reverse dispersion, the navigation data can be demodulated.

The signal processor 20 develops, in the ROM 21, a program which is designated from the system program and the various application programs stored in the RAM 22, and executes various processing in cooperation with the program developed in the ROM 21. For example, a program which demodulates the navigation data is stored in the RAM 22.

The reception of a GPS satellite from the receiver 19 triggers the RAM 22 to read a program for demodulating the navigation data. The program which demodulate the read navigation data is developed in the ROM 21, and the processing for demodulating the navigation data is executed in cooperation with the program which demodulates the navigation data and the signal processor 20.

Next, the navigation data will be explained with reference to FIGS. 3A and 3B.

Figure 3B:
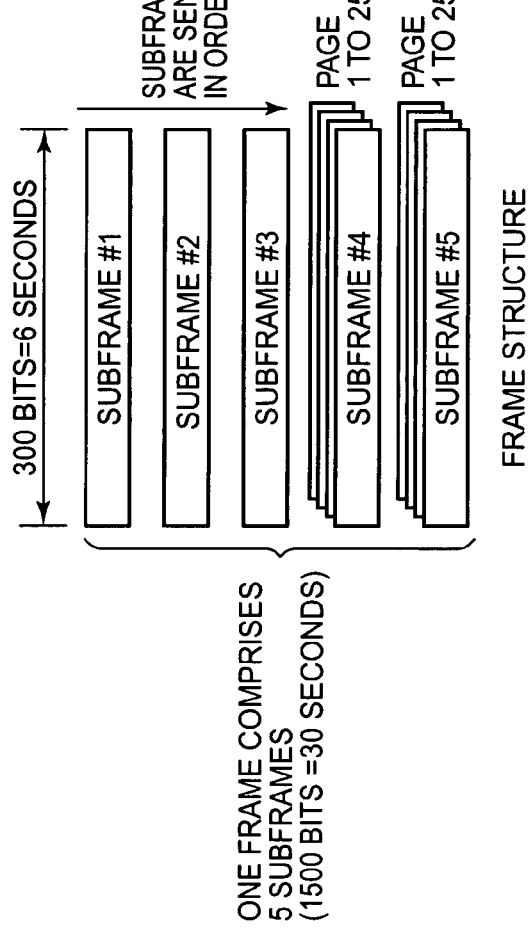
FIG. 3B is a schematic diagram of configuration of subframes in the frame structure shown in FIG. 3A.
Figure 3A:
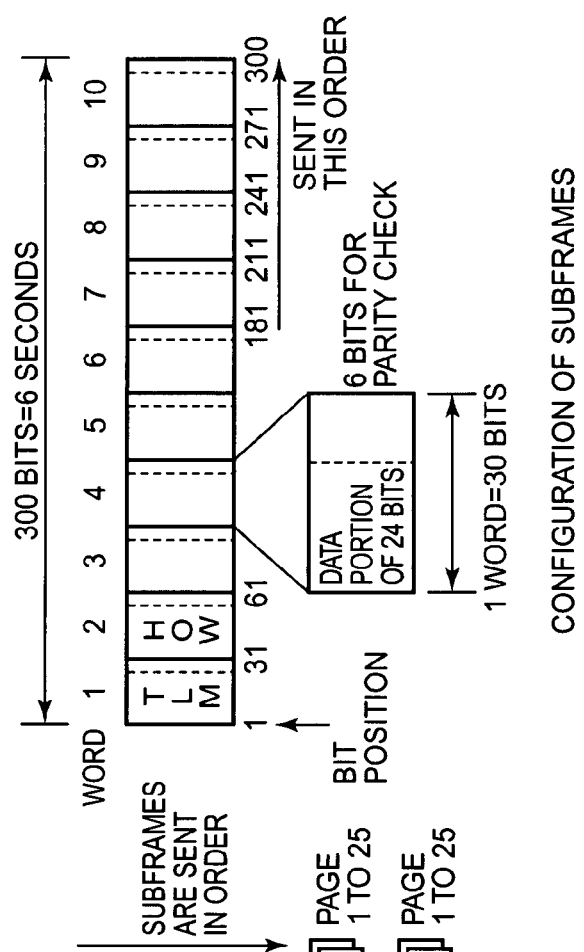
FIG. 3A is a diagram showing a frame structure of navigation data in a format of a navigation message.

FIG. 3A shows a frame structure of the navigation data. One cycle of the navigation data is called a frame (unit). One frame is 1,500 bits, and it takes 30 seconds to receive the one frame. The frame comprises five subframes (each 300 bits), and subframes are sent from a subframe 1 in the order, and if a sending operation of a subframe 5 is ended, the procedure is returned to a sending operation of the subframe 1 again.

Figure 4:
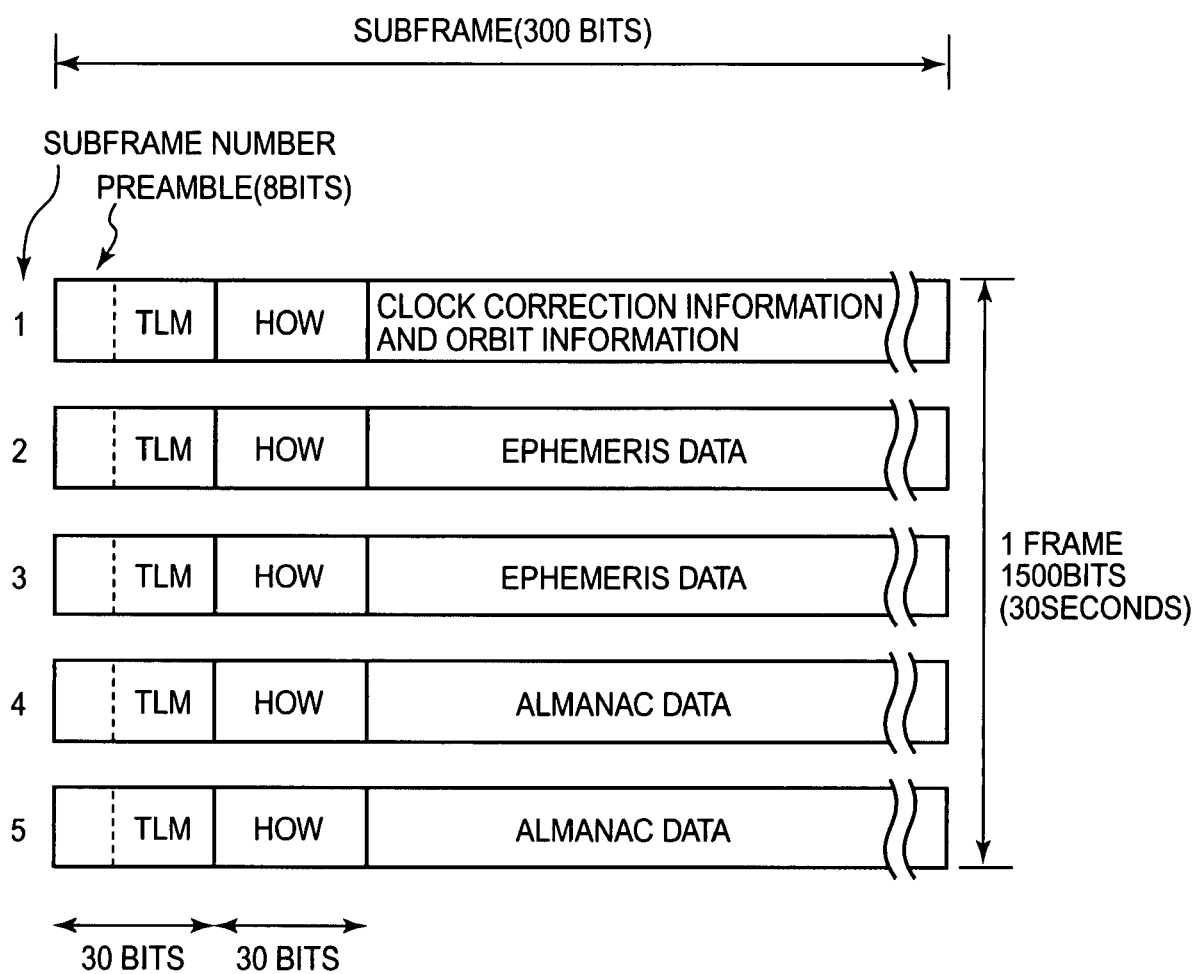
FIG. 4 is a schematic diagram of configuration of subframes in the frame structure shown in FIG. 3A.

Next, FIGS. 3A and 4 are schematic diagrams of configuration of subframes.

Clock correction information and orbit information (ephemeris data) of a satellite which sends signals are included in subframes 1 to 3 of the five subframes (see FIG. 4). Concerning the subframes 4 and 5, all of the satellites send the same contents, and the contents are outline orbit information (almanac data) and ionospheric correction information of all GPS satellites (maximum 32 satellites) on the orbit (see FIG. 4). Since the amount of the data is high, the data is divided into pages and accommodated in the subframe. That is, as shown in FIG. 3A, data sent from the subframes 4 and 5 are divided into 1 to 25 pages, and contents of different pages are sent to frames in the order. In order to send the contents of all pages, 25 frames are required, and in order to obtain all information of the navigation data, it takes 12 minutes and 30 seconds.

The contents of the subframe are divided into a unit called word as shown in FIGS. 3B and 4. One word has 30 bits, and one subframe corresponds to 10 words, and each word comprises a data portion of 24 bits and 6 bits for parity check. In each subframe, a TLM (telemetry) word is described at a top, and HOW is described subsequently. A synchronizing pattern is included in the TLM word, and time information of a GPS signal is included in the HOW.

Time in the GPS signal is managed on a weekly basis. On weekend, at 0:00 of every Sunday (24:00 of Saturday), time is expressed as elapsed time thereafter (TOW (time of week)). Numbers expressing the elapsed time on a 1.5 seconds-to-1.5 seconds basis are includes in the HOW, and from this information, the receiver can find the current time. Numbers are allocated to respective weeks, and a week which starts from 00:00:00 on Jan. 6, 1980 is defined as 0. One is added to the week number WN whenever one week is elapsed. For example, a week number of a week which starts from Oct. 10, 2004 is 1292.

The navigation data is divided into the five subframes and accommodated therein. A portion of the subframe will be explained.

A clock correction coefficient and a numerical value representing a state of a satellite itself which sends the navigation data are accommodated in the subframe 1 of the navigation data. As shown in FIG. 5, words of the above-described week number WN, a distance measuring precision URA, and a satellite health state SV health are described after the top TLM word and HOW.

The distance measuring precision URA is a reference of a distance measuring precision when a pseudo distance (distance between a receiver and a GPS satellite as measured while adding an error caused by advance of clock of the receiver) is measured, and if the distance measuring precision URA is 15, this means that there is an abnormal condition.

The satellite health state SV health is a code representing a state of a satellite, and when the satellite health state SV health is other than 0, this means that there is an abnormal condition.

Orbit information of each satellite is accommodated in each of the subframes 2 and 3. The orbit information is called ephemeris, and a position of a GPS satellite at arbitrary time can be calculated.

Outline orbit information of all of the GPS satellites is called almanac data. The almanac data is accommodated in pages 2 to 5 of the subframe 4 and pages 1 to 24 of subframe 5, the number of total pages is 32, and the almanac data corresponds to 32 GPS satellites. Ionospheric distributed at an altitude of 100 km or higher delays radio wave, and information for correcting the delayed amount is accommodated in page 18 of the subframe 4.

Next, the operation of the clock 100 will be explained with reference to FIG. 6.

Figure 6:
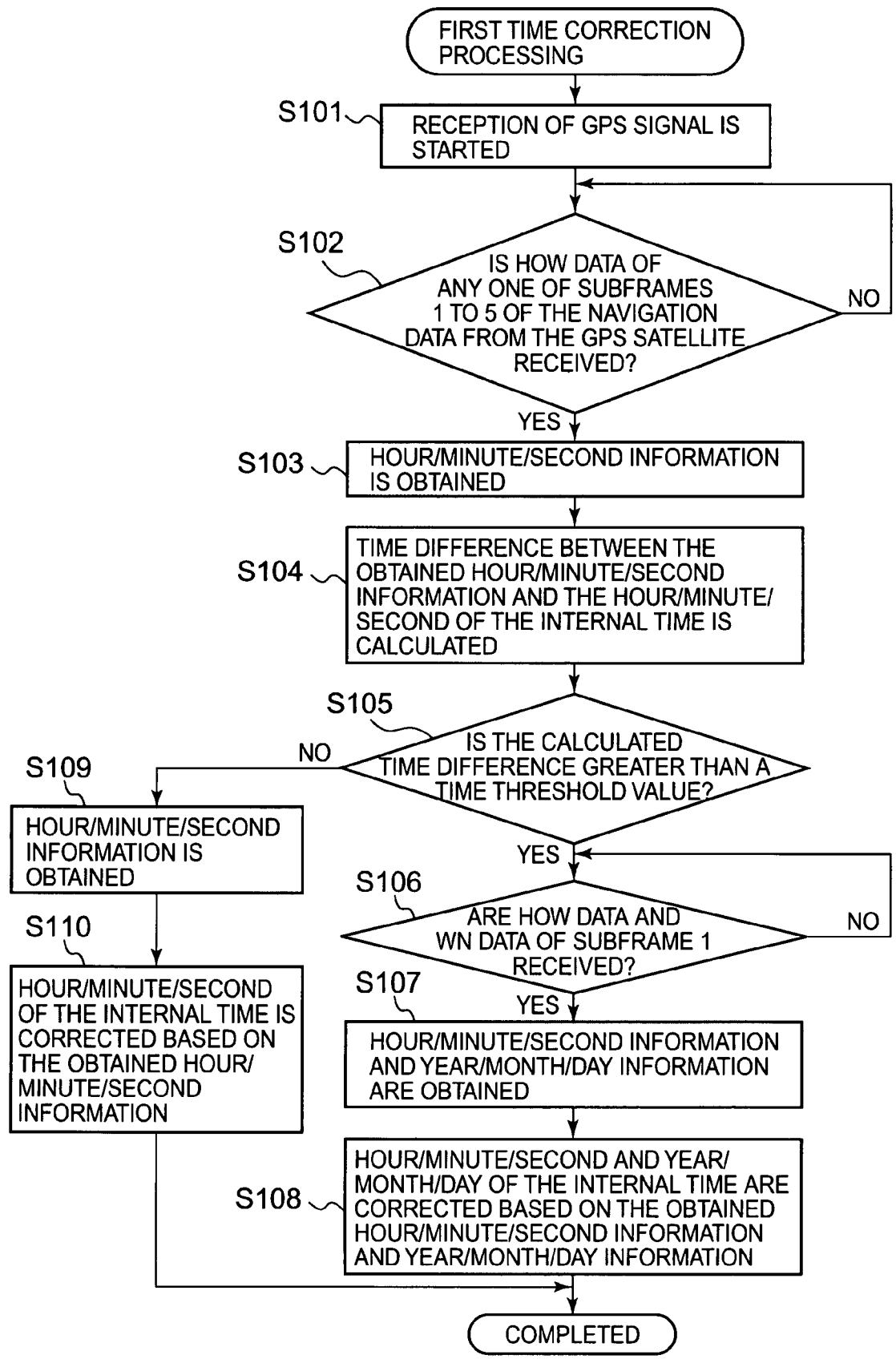
FIG. 6 is a flowchart showing first time correction processing of the preferable embodiments of the present invention.

FIG. 6 is a flowchart of the first time correction processing. The first time correction processing is processing for correcting the internal time of the clock 100 based on a GPS signal.

For example, in the clock 100, input of execution instructions of the first time correction processing through the operating section 14 triggers to read the first time correction processing program from the ROM 17. The read first time correction program is developed in the RAM 16, and the first time correction processing is executed in cooperation with the CPU 12 and the developed first time correction program.

First, reception of GPS signal is started (step S101). Here, the reception starting operation of a GPS signal will be explained. The clock 100 estimates a plurality of GPS candidates which can be received by the clock 100 from various data sets. Here, the various data sets include almanac data, internal time data obtained from the timing section 18, and subject apparatus position data of the clock 100.

Next, a satellite number is referred to from the satellite number area 151 of the storing section 15, and a satellite number corresponding to an estimated satellite candidate of the satellite numbers and an elevation angle corresponding to the satellite number are accommodated in the satellite number area 161 and the elevation angle area 162 of the RAM 16, respectively. Of the GPS satellite (satellite candidate) of a satellite number accommodated in the satellite number area 161 of the RAM 16, one of non-selected GPS satellites that has the greatest elevation angle is selected. The selected satellite number is accommodated in one of the satellite number areas 163 of the RAM 16 as the one satellite number. The elevation angle is an angle formed between a GPS satellite and the ground where the clock 100 exists.

Next, a C/A code area 172 of the selected one GPS satellite is read from the C/A code area 17 (a C/A code stored in the ROM 17 is called a stored C/A code, hereinafter). Next, navigation data is received from the selected one GPS satellite, and its C/A code is obtained. The stored C/A code and the received C/A code are compared with and checked against each other. When the stored C/A code and the received C/A code match with each other, it is assumed that the reception of the GPS signal is started.

It is determined whether HOW data of any one of subframes 1 to 5 of the navigation data from the GPS satellite is received (step S102). When HOW data of any of the subframes 1 to 5 of the navigation data is not received (step S102; NO), the procedure is moved to step S102. When HOW data of any of the subframes 1 to 5 of the navigation data is received (step S102; YES), hour/minute/second information is obtained from the received HOW data (step S103).

Next, a time difference between the obtained hour/minute/second information and the hour/minute/second of the internal time of the time device 18 is calculated (step S104). It is determined whether the calculated time difference is greater than a time threshold value (step S105). Here, the time threshold value is one hour for example. When the calculated time difference is smaller than the time threshold value (step S105; NO), the hour/minute/second information is obtained from the received HOW data (step S109). The hour/minute/second of the internal time is corrected based on the obtained hour/minute/second information (step S110).

When the calculated time difference is greater than the time threshold value (step S105; YES), it is determined whether the HOW data and WN data of the subframe 1 are received (step S106). When the HOW data and WN data of the subframe 1 are received (step S106; YES), hour/minute/second information and year/month/day information are obtained from the HOW data and WN data (step S107). Here, when the year/month/day information is obtained from the WN data, the WN data is converted into year/month/day information. When the WN data is 1292 for example, the year/month/day information is a week which stars from Oct. 10, 2004. The hour/minute/second and year/month/day of the internal time are corrected based on the obtained hour/minute/second information and year/month/day information (step S108). After steps S108 and S109 are executed, the first time correction processing is completed.

According to the embodiment, when the time difference between the hour/minute/second indicated in the hour/minute/second information obtained by the signal processor 20 and the hour/minute/second of time information counted by the timing section 18 is greater than a predetermined time difference, it is possible to correct the year/month/day and hour/minute/second counted by the timing section 18 using both the year/month/day information and hour/minute/second information obtained by the signal processor 20. When the time difference is smaller than the predetermined time difference, it is possible to correct the hour/minute/second counted by the timing section 18 using the hour/minute/second information obtained by the signal processor 20. Therefore, when the time difference is large and the reliability of time counted by the timing section 18 is low, not only the hour/minute/second but also the year/month/day are corrected, and when the time difference is small and the reliability of time counted by the timing section 18 is high, only the hour/minute/second can be corrected without correcting the year/month/day, and it is possible to correct time precisely depending upon the time difference.

When a time difference between hour/minute/second indicated in the hour/minute/second information obtained by the signal processor 20 and hour/minute/second of time information counted by the timing section 18 is greater than the predetermined time difference, it is possible to correct the year/month/day and hour/minute/second counted by the timing section 18 using both the year/month/day information and hour/minute/second information obtained by the signal processor 20. When the time difference is smaller than the predetermined time difference, the hour/minute/second counted by the timing section 18 can be corrected using the hour/minute/second information in the first subframe among the plurality of subframes obtained by the signal processor 20.

Second Embodiment

A second embodiment of the present invention will be explained with reference to FIG. 7.

Figure 7:
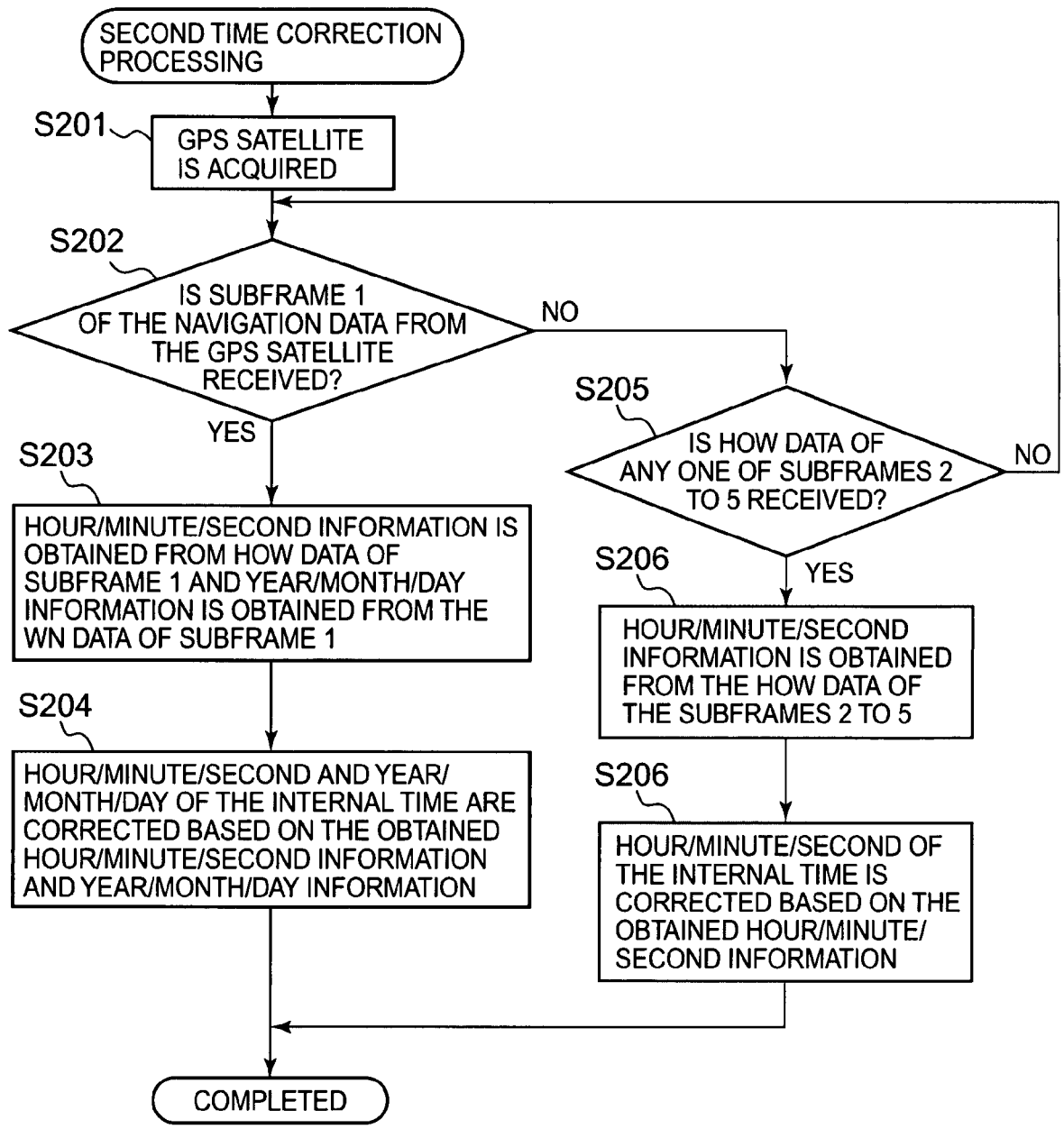
FIG. 7 is a flowchart showing second time correction processing of the preferable embodiments of the present invention.

FIG. 7 is a flowchart of second time correction processing.

In an apparatus structure of this embodiment, the clock 100 is used like the first embodiment, and the same elements are designated with the same symbols. Detailed explanation of the same portion will be omitted and only different portions will explained.

In the clock 100, a second time correction program is stored in the ROM 17.

The second time correction processing to be executed by the clock 100 of the embodiment will be explained with reference to FIG. 7. The second time correction processing is processing for correcting year/month/day and hour/minute/second of the internal time when a subframe 1 of the navigation data of the GPS signal is received.

For example, in the clock 100, the input of the execution instructions of the second time correction processing through the operating section 14 triggers to read the second time correction processing program from the ROM 17, the read second time correction processing is developed in the RAM 16, and the second time correction processing is executed in cooperation with the CPU 12 and the developed second time correction processing.

First, a GPS satellite is acquired (step S201). Then, it is determined whether a subframe 1 of the navigation data from the GPS satellite is received (step S202). When the subframe 1 of the navigation data is received from the GPS satellite (step S202; YES), hour/minute/second information is obtained from HOW data of the subframe 1 and year/month/day information is obtained from the WN data of the subframe 1 (step S203). Here, when the year/month/day information is to be obtained from the WN data, the WN data is converted from the year/month/day information. For example, when the WN data is 1292, the year/month/day information is a week which starts from Oct. 10, 2004. The hour/minute/second and year/month/day of the internal time are corrected based on the obtained hour/minute/second information and year/month/day information (step S204).

In step S202, when the subframe 1 of the navigation data is not received from the GPS satellite (step S202; NO), it is determined whether HOW data of any one of subframes 2 to 5 is received (step S205). When the HOW data of any one of subframes 2 to 5 is received (step S205; YES), hour/minute/second information is obtained from the HOW data of the subframes 2 to 5 (step S206). When the HOW data of subframes 2 to 5 is not received (step S205; NO), the procedure is moved to step S202.

After step S206 is executed, the hour/minute/second of internal time is corrected based on the obtained hour/minute/second information (step S207). After steps S204 and S207 are executed, the second time correction processing is completed.

According to the embodiment, when it is determined that a subframe included in a GPS signal received by the receiver 19 is a first subframe as a result of determination by the CPU 12, it is possible to correct the year/month/day and hour/minute/second of clock section using the year/month/day information and hour/minute/second information in the first subframe. When it is determined that the subframe included in the GPS signal received by the receiver 19 is other subframe, it is possible to correct the hour/minute/second of the clock section using the hour/minute/second information in the other subframe. With this, the hour/minute/second information can be received within six seconds or less in the first subframe or second to fifth subframes. Therefore, the time correcting speed can be increased and the power consumption can be reduced.

Although the display 13 is provided in the above embodiment, the display 13 may not be provided, and the clock may output current time information on hardware such as an external display or a computer.

In the correction of the internal time, correction of a correction value may be included. Here, the correction value an error amount including an error amount generated before a GPS signal reaches the clock 100, an error amount of an internal control processing time of the clock 100, and an error amount caused by leap second. For example., suppose that an error amount generated before a GPS signal reaches the clock 100 is 0.07 seconds, and an error amount of the internal control processing time in the clock 100 is 0.03 seconds, and an error amount caused by the leap second is 14 seconds. In this case, the correction value is 14.1 seconds. This correction value is previously stored in the storing section 15. The correction value may be read, and correction processing including the correction value may be carried out in steps S108, S110, S204 and S207. When the correction value is 14.1 seconds, correction for subtracting 14.1 seconds from time information obtained from the GPS signal is carried out.

In the embodiment, a GPS signal is received by one channel, but the GPS signal may be received by a plurality of channels. In this case, a GPS signal is received by at least three channels. By receiving a GPS signal by at least three channels, it is possible not only to correct time of the clock 100, but also to determine a position.

A detailed structure and detailed operation of the clock 100 in the above embodiments can appropriately be changed within a range not departing from the subject matter of the present invention.

As described above, the preferable embodiments of the invention have the following structures, and can exhibit the following effects.

That is, according to the above preferable embodiments, there is provided a time correction control apparatus(e.g., clock 100 shown in FIG. 1), comprising a receiving section to receive a GPS signal(e.g., receiver 19 shown in FIG. 1; S101 in FIG. 6), a clock section (e.g., timing section 18 in FIG. 1) to count time, an obtaining section (e.g., signal processor 20 in FIG. 1, S103 and S107 in FIG. 6) to obtain at least one of hour/minute/second information and year/month/day information included in the GPS signal received by the receiving section, a calculating section (e.g., CPU 12 in FIG. 1; S104 in FIG. 6) to calculate a time difference between hour/minute/second of the hour/minute/second information obtained by the obtaining section and hour/minute/second of the time counted by the clock section, a comparing section (e.g., CPU 12 in FIG. 1; S105 in FIG. 6) to compare the time difference calculated by the calculating section and a predetermined time difference, and a time correction control section (e.g., CPU 12 in FIG. 1; S107, S108 and S110 in FIG. 6) to correct year/month/day and the hour/minute/second counted by the clock section using both the year/month/day information and the hour/minute/second information obtained by the obtaining section when the calculated time difference is greater than the predetermined time difference as a result of comparison made by the comparing section, and to correct the hour/minute/second counted by the clock section using the hour/minute/second information obtained by the obtaining section when the calculated time difference is smaller than the predetermined time difference.

According to this time correction control apparatus, when the time difference between the hour/minute/second indicated in the hour/minute/second information obtained by the obtaining section and the hour/minute/second of the time information counted by the clock section is greater than the predetermined time difference, the year/month/day and hour/minute/second counted by the clock section can be corrected using both the year/month/day information and hour/minute/second information obtained by the obtaining section. When the time difference is smaller than the predetermined time difference, the hour/minute/second counted by the clock section can be corrected using the hour/minute/second information obtained by the obtaining section. Therefore, when the time difference is large and the reliability of time counted by the clock section is low, not only the hour/minute/second but also the year/month/day can be corrected, and when the time difference is small and the reliability of time counted by the clock section is high, only the hour/minute/second can be corrected without correcting the year/month/day, and the high precision correction suitable for the time difference can be made.

Further, according to the preferable embodiment, there is provided a time correction control apparatus (e.g., clock 100 in FIG. 1), comprising a receiving section (e.g., receiver 19 in FIG. 1; S101 in FIG. 6) to receive a GPS signal including a plurality of subframes constituting navigation data, a clock section (e.g., timing section 18 in FIG. 1) to count time, an obtaining section (e.g., signal processor 20 in FIG. 1; S103 and S107 in FIG. 6) to obtain at least one of hour/minute/second information and year/month/day information in any one of the plurality of the subframes included in the GPS signal received by the receiving section, a calculating section (e.g., CPU 12 in FIG. 1; S104 in FIG. 6) to calculate a time difference between hour/minute/second of the hour/minute/second information in any one of the plurality of the subframes obtained by the obtaining section and hour/minute/second of the time information counted by the clock section, a comparing section (e.g., CPU 12 in FIG. 1; S105 in FIG. 6) to compare the time difference calculated by the calculating section and a predetermined time difference, and a time correction control section (e.g., CPU 12 in FIG. 1; S107, S108 and S110 in FIG. 6) to correct year/month/day and hour/minute/second counted by the clock section using both the year/month/day information and the hour/minute/second information obtained by the obtaining section when the calculated time difference is greater than the predetermined time difference as a result of comparison made by the comparing section, and to correct the hour/minute/second counted by the clock section using the hour/minute/second information in a first subframe among the plurality of the subframes obtained by the obtaining section when the calculated time difference is smaller than the predetermined time difference.

According to this time correction control apparatus, when the time difference between the hour/minute/second indicated in the hour/minute/second information obtained by the obtaining section and the hour/minute/second of the time information counted by the clock section is greater than the predetermined time difference, the year/month/day and hour/minute/second counted by the clock section can be corrected using both the year/month/day information and hour/minute/second information obtained by the obtaining section. When the time difference is smaller than the predetermined time difference, the hour/minute/second counted by the clock section can be corrected using the hour/minute/second information in the first subframe among the plurality of subframes obtained by the obtaining section.

Further, the according to the preferable embodiment, there is provided a time correction control apparatus (e.g., clock 100 in FIG. 1), comprising a receiving section (e.g., receiver 19 in FIG. 1; S201 in FIG. 7) to receive a GPS signal including a plurality of subframes constituting navigation data, a clock section (e.g., timing section 18 in FIG. 1) to count time, a determining section (e.g., CPU 12 in FIG. 1; S202 and S205 in FIG. 7) to determine whether a subframe is a first subframe among the plurality of the subframes included in the GPS signal received by the receiving section or one of the remaining subframes, and a time correction control section (e.g., CPU 12 in FIG. 1; S202 to S204 in FIG. 7; S205 to S207 in FIG. 7) to correct year/month/day and hour/minute/second of the clock section using year/month/day information and hour/minute/second information in the first subframe when it is determined that a subframe included in the GPS signal received by the receiving device is the first subframe as a result of determination by the determining section, and to correct the hour/minute/second of the clock section using the hour/minute/second information in the one of the remaining subframes when it is determined that the subframe included in the GPS signal received by the receiving section is the one of the remaining subframes.

According to this time correction control apparatus, it is possible to correct year/month/day and hour/minute/second of the clock section using year/month/day information and hour/minute/second information in a first subframe when it is determined that a subframe included in a GPS signal received by the receiving section is a first subframe as a result of determination by the determining section, and it is possible to correct the hour/minute/second of the clock section using the hour/minute/second information in another subframe when it is determined that the subframe included in the GPS signal received by the receiving section is the other subframe. With this, since it is possible to receive the hour/minute/second information within six seconds or less using the first subframe or any one of the second to fifth subframes, the speed of time correction can be increased and the power consumption of the time correction control apparatus can be reduced.

Further, according to the preferable embodiment, there is provided a time correction control method used for a time correction control apparatus (e.g., clock 100 in FIG. 1) having a clock section (e.g., timing section 18 in FIG. 1) comprising receiving a GPS signal(e.g., receiver 19 in FIG. 1; S101 in FIG. 6), obtaining at least one of hour/minute/second information and year/month/day information included in the received GPS signal (e.g., signal processor 20 in FIG. 1; S103 and S107 in FIG. 6), calculating a time difference (e.g., CPU 12 in FIG. 1; S104 in FIG. 6) between hour/minute/second of the obtained hour/minute/second information and hour/minute/second of time counted by the clock section, comparing the calculated time difference and a predetermined time difference (e.g., CPU 12 in FIG. 1; S105 in FIG. 6), and correcting the year/month/day and hour/minute/second (e.g., CPU 12 in FIG. 1; S107, S108 and S109 in FIG. 6) counted by the clock section using both the obtained year/month/day information and the obtained hour/minute/second information when it is determined that the calculated time difference is greater than the predetermined time difference as a result of the comparing, and correcting the hour/minute/second counted by the clock section using the obtained hour/minute/ second information when it is determined that the calculated time difference is smaller than the predetermined time difference.

According to the time correction control method, when the time difference between the hour/minute/second indicated in the obtained hour/minute/second information and the hour/minute/second of the time information counted by the clock section is greater than the predetermined time difference, it is possible to correct the year/month/day and hour/minute/second counted by the clock section using both the year/month/day information and hour/minute/second information obtained by the obtaining section, and when the time difference is smaller than the predetermined time difference, it is possible to correct the hour/minute/second counted by the clock section using the obtained hour/minute/second information. Therefore, when the time difference is large and the reliability of time counted by the clock section is low, not only the hour/minute/second but also the year/month/day can be corrected, and when the time difference is small and the reliability of time counted by the clock section is high, only the hour/minute/second can be corrected without correcting the year/month/day, and it is possible to correct time precisely in accordance with the time difference.

Further, according to the preferable embodiment, there is provided a time correction control method used for a time correction control apparatus (e.g., clock 100 in FIG. 1) having a clock section (e.g., timing section 18 in FIG. 1) comprising receiving a GPS signal including a plurality of subframes constituting navigation data (e.g., S101 in FIG. 6), obtaining at least one of hour/minute/second information and year/month/day information in any one of the plurality of the subframes included in the received GPS signal (e.g., S103 and S107 in FIG. 6), calculating a time difference (e.g., S104 in FIG. 6) between hour/minute/second of the hour/minute/second information in any one of the plurality of the obtained subframes and hour/minute/second of time counted by the clock section, comparing the calculated time difference and a predetermined time difference (e.g., S105 in FIG. 6), and correcting year/month/day (e.g., S107, S108 and S110 in FIG. 6) counted by the clock section using both the obtained year/month/day information and the obtained hour/minute/second information when the calculated time difference is greater than the predetermined time difference as a result of the comparing, and correcting the hour/minute/second counted by the clock section using the hour/minute/second information in a first subframe of the plurality of the obtained subframes when the calculated time difference is smaller than the predetermined time difference.

According to this time correction control method, when the time difference between hour/minute/second indicated in the obtained hour/minute/second information and hour/minute/second in the time information counted by the clock section is greater than the predetermined time difference, it is possible to correct the year/month/day and hour/minute/second counted by the clock section using both the obtained year/month/day information and obtained hour/minute/second information, and when the time difference is smaller than the predetermined time difference, it is possible to correct the hour/minute/second counted by the clock section using the hour/minute/second information in the first subframe among the plurality of subframes obtained by the obtaining section.

Further, according to the preferable embodiment, there is provided a time correction control method used for a time correction control apparatus (e.g., clock 100 in FIG. 1) having a clock section (e.g., timing section 18 in FIG. 1) comprising receiving a GPS signal including a plurality of subframes constituting navigation data (e.g., S201 in FIG. 7), determining whether a subframe is a first subframe of the plurality of the subframes or one of the remaining subframes of the plurality of the subframes included in the received GPS signal (e.g., S202 and S205 in FIG. 7), and correcting year/month/day and hour/minute/second (e.g., S202 to S204 in FIG. 7; S205 to S207 in FIG. 7) of a timing section using year/month/day information and hour/minute/second information in the first subframe when the subframe included in the received GPS signal is the first subframe as a result of the determining, and correcting the hour/minute/second of the timing section using the hour/minute/second information in the one of the remaining subframes when the subframe included in the received GPS signal is the one of the remaining subframes.

According to this time correction control method, when it is determined that the subframe included in the received GPS signal is the first subframe as a result of the determining, it is possible to correct year/month/day and hour/minute/second of the clock section using the year/month/day information and hour/minute/second information in the first subframe, and when it is determined that the subframe included in the received GPS signal is the other subframe, it is possible to correct hour/minute/second of the clock section using the hour/minute/second information in the other subframe. With this, since it is possible to receive the hour/minute/second information within six seconds or less using the first subframe or any one of second to fifth subframes, it is possible to increase the time correcting speed and to reduce the power consumption of the time correction control apparatus.

The entire disclosure of Japanese Patent Application No. 2006-99887 filed on Mar. 31, 2006, including Specification, Claims, Drawings, and Abstract is incorporated herein by reference in its entirety.

Although various embodiments have been described and explained, the present invention is not limited to those embodiments shown. Therefore, the scope of the invention is intended to be limited solely by the scope of the claims that follow.

What is claimed is:

1. A time correction control apparatus, comprising:
   a receiving section to receive a GPS signal;
   a clock section to count time;
   an obtaining section to obtain at least one of hour/minute/second information and year/month/day information included in the GPS signal received by the receiving section;
   a calculating section to calculate a time difference between hour/minute/second of the hour/minute/second information obtained by the obtaining section and hour/minute/second of the time counted by the clock section;
   a comparing section to compare the time difference calculated by the calculating section and a predetermined time difference; and
   a time correction control section to correct year/month/day and the hour/minute/second counted by the clock section using both the year/month/day information and the hour/minute/second information obtained by the obtaining section when the calculated time difference is greater than the predetermined time difference as a result of comparison made by the comparing section, and to correct the hour/minute/second counted by the clock section using the hour/minute/second information obtained by the obtaining section when the calculated time difference is smaller than the predetermined time difference.

2. A time correction control apparatus, comprising:
   a receiving section to receive a GPS signal including a plurality of subframes constituting navigation data;

a clock section to count time;

an obtaining section to obtain at least one of hour/minute/second information and year/month/day information in any one of the plurality of the subframes included in the GPS signal received by the receiving section;

a calculating section to calculate a time difference between hour/minute/second of the hour/minute/second information in any one of the plurality of the subframes obtained by the obtaining section and hour/minute/second of the time information counted by the clock section;

a comparing section to compare the time difference calculated by the calculating section and a predetermined time difference; and a time correction control section to correct year/month/day and hour/minute/second counted by the clock section using both the year/month/day information and the hour/minute/second information obtained by the obtaining section when the calculated time difference is greater than the predetermined time difference as a result of comparison made by the comparing section, and to correct the hour/minute/second counted by the clock section using the hour/minute/second information in a first subframe among the plurality of the subframes obtained by the obtaining section when-the calculated time difference is smaller than the predetermined time difference.

3. A time correction control apparatus, comprising:

a receiving section to receive a GPS signal including a plurality of subframes constituting navigation data;

a clock section to count time;

a determining section to determine whether a subframe is a first subframe among the plurality of the subframes included in the GPS signal received by the receiving section or one of the remaining subframes; and a time correction control section to correct year/month/day and hour/minute/second of the clock section using year/month/day information and hour/minute/second information in the first subframe when it is determined that a subframe included in the GPS signal received by the receiving device is the first subframe as a result of determination by the determining section, and to correct the hour/minute/second of the clock section using the hour/minute/second information in the one of the remaining subframes when it is determined that the subframe included in the GPS signal received by the receiving section is the one of the remaining subframes.

4. A time correction control method used for a time correction control apparatus having a clock section comprising:

receiving a GPS signal;

obtaining at least one of hour/minute/second information and year/month/day information included in the received GPS signal;

calculating a time difference between hour/minute/second of the obtained hour/minute/second information and hour/minute/second of time counted by the clock section;

comparing the calculated time difference and a predetermined time difference; and correcting the year/month/day and hour/minute/second counted by the clock section using both the obtained year/month/day information and the obtained hour/minute/second information when it is determined that the calculated time difference is greater than the predetermined time difference as a result of the comparing, and correcting the hour/minute/second counted by the clock section using the obtained hour/minute/second information when it is determined that the calculated time difference is smaller than the predetermined time difference.

5. A time correction control method used for a time correction control apparatus having a clock section comprising:

receiving a GPS signal including a plurality of subframes constituting navigation data;

obtaining at least one of hour/minute/second information and year/month/day information in any one of the plurality of the subframes included in the received GPS signal;

calculating a time difference between hour/minute/second of the hour/minute/second information in any one of the plurality of the obtained subframes and hour/minute/second of time counted by the clock section;

comparing the calculated time difference and a predetermined time difference; and correcting year/month/day counted by the clock section using both the obtained year/month/day information and the obtained hour/minute/second information when the calculated time difference is greater than the predetermined time difference as a result of the comparing, and correcting the hour/minute/second counted by the clock section using the hour/minute/second information in a first subframe of the plurality of the obtained subframes when the calculated time difference is smaller than the predetermined time difference.

6. A time correction control method used for a time correction control apparatus having a clock section comprising:

receiving a GPS signal including a plurality of subframes constituting navigation data;

determining whether a subframe is a first subframe of the plurality of the subframes or one of the remaining subframes of the plurality of the subframes included in the received GPS signal; and correcting year/month/day and hour/minute/second of a timing section using year/month/day information and hour/minute/second information in the first subframe when the subframe included in the received GPS signal is the first subframe as a result of the determining, and correcting the hour/minute/second of the timing section using the hour/minute/second information in the one of the remaining subframes when the subframe included in the received GPS signal is the one of the remaining subframes.

* * * * *